UNITED STATES PATENT OFFICE.

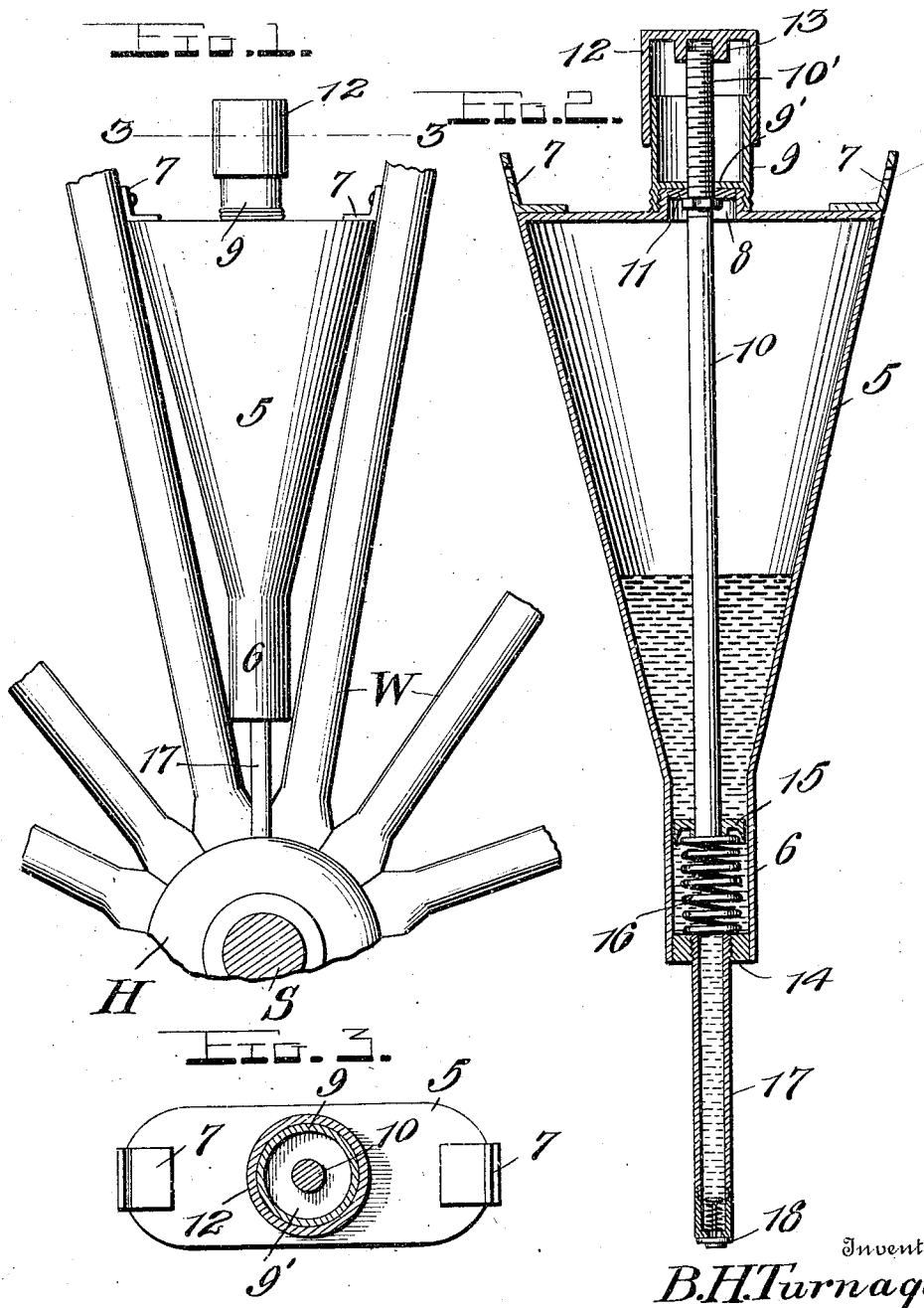

BENJIMAN H. TURNAGE, OF BLENHEIM, SOUTH CAROLINA.

LUBRICATOR.

995,389.  Specification of Letters Patent.  Patented June 13, 1911.

Application filed October 22, 1910. Serial No. 588,528.

*To all whom it may concern:*

Be it known that I, BENJIMAN H. TURNAGE, a citizen of the United States, residing at Blenheim, in the county of Marlboro and State of South Carolina, have invented certain new and useful Improvements in Lubricators, of which the following is a specification, reference being had to the accompanying drawings.

This invention relates to lubricators and has for its object to provide a simple and novel lubricating device for axle spindles upon which the wheels of the vehicle are mounted.

A further object of the invention is to provide means carried by the wheel and extending through the hub thereof for supplying lubricant to the axle, and means for regulating the flow of the lubricant.

A further object of the invention is to provide a lubricating device adapted to be secured between the spokes of a vehicle wheel and having a valved supply pipe extending through the hub thereof adapted to normally close the same, said device being easily attachable or removable to or from the vehicle wheel.

With these and other objects in view, the invention consists of the novel features of construction and the combination and arrangement of parts hereinafter fully described and claimed, and illustrated in the accompanying drawings, in which—

Figure 1 is a side elevation of a fragment of a vehicle wheel illustrating the application of my improved lubricating device thereof; Fig. 2 is an enlarged vertical section of the lubricator; and Fig. 3 is a section taken on the line 3—3 of Fig. 1.

Referring in detail to the accompanying drawing H designates the hub of the vehicle wheel and S the spindle of the axle upon which the same is mounted. Spokes W radiate from the wheel hub and between any two adjacent spokes of the wheel my improved lubricator is adapted to be mounted.

The lubricator comprises a reservoir 5 which is of elongated tapered form for arrangement between the wheel spokes. The lower end of this reservoir is formed with a cylindrical tubular portion 6 and to the upper end thereof at opposite sides of the same the attaching plates 7 are secured, said plates being apertured to receive screws, nails or other suitable fastening devices for attaching the device to the spokes of the wheel. the top 5 of the reservoir is centrally formed with a threaded annulus 8 upon which the tubular neck 9 is adapted to be threaded, the lower end of this neck having a plate 9' formed therein and provided with a central opening to receive the upper end of the plunger rod 10 which is vertically movable through the reservoir 5. A leather washer 11 is arranged within the annulus 8 and against the under side of the plate 9' to obviate the liability of the oil being forced upwardly around the plunger and into the sleeve 9. The upper end of the plunger rod 10 is threaded, as shown at 10', for engagement in an interiorly threaded boss 13 formed within the cap 12. This cap is movable upon the sleeve 9 and such movement may be limited as desired by threading the cap upon the upper end of the plunger rod 10 to a greater or less extent. In this manner the quantity of lubricant discharged upon the depression of the plunger rod may be suitably regulated. The lower end of the tubular portion 6 of the reservoir is closed by a head plate 14 and in this tubular portion the plunger or piston head 15 is movable. A coil spring 16 is arranged between the plunger 15 and the head plate 14 and normally forces said plunger upwardly. A supply pipe 17 is threaded into the plate 14 and its lower end disposed through an opening in the hub H. A pressure valve 18 of any preferred construction is arranged in the lower end of the pipe 17 and normally closes the same to prevent a continuous discharge of the oil upon the axle spindle.

In the operation of my improved lubricator, when it is desired to lubricate the spindle, the operator presses downwardly upon the cap 12, thereby forcing the plunger 15 downwardly in the lower tubular end 6 of the reservoir. This plunger 15 is spaced slightly from the walls of the tubular extension of the reservoir so that the oil or other lubricant may flow around the same into the lower end of the tube 6 and beneath the plunger head. Thus when the plunger is depressed this oil is forced through the pipe 17 and the pressure of the same opens the valve 18 whereby the oil is discharged upon the periphery of the axle spindle. In this manner oil may be supplied to the axle at any time without necessitating the removal of the wheel. The reservoir 5 may be supplied with oil through the upper end thereof by removing the cap 12, sleeve 9, and the washer 11, or, if desired, a separate supply opening may be provided in the top of the reservoir. The device is extremely simple and may be arranged upon the vehicle wheel with but little labor and slight expense. The waste of the lubricant is prevented by means of the valve 18, thus economizing in its use while at the same time a supply is constantly maintained for application to the axle.

Having thus described the invention what is claimed is:

1. In a lubricator, the combination of a reservoir having a reduced tubular lower end, said reservoir also having an opening in its top and a threaded flange surrounding said opening, a plunger rod movable in said reservoir having a head on its lower end disposed in the reduced portion thereof, said rod extending through the opening, a tubular neck threaded upon said flange having a plate integrally formed in its lower end engaging upon the upper end of the flange and closing said opening, a washer arranged on the plunger rod, said plate having an opening therein through which the rod is movable, a cap having an interior boss threaded upon the upper end of said plunger rod and telescopically engaging said tubular neck, the lower end of said cap being adapted to engage the top of the reservoir and limit the downward movement of the plunger, a head in the lower end of the reservoir, an oil conducting pipe threaded in said head, and a coiled spring disposed between said head and the plunger head to normally project the plunger rod upwardly within the reservoir.

2. In a lubricator, the combination of a reservoir having a feed opening in its top and a threaded flange surrounding said opening, a plunger rod movable in said reservoir and extending through the feed opening and above the flange, a tubular neck threaded upon said flange having a plate integrally formed in its lower end disposed on the flange and closing the feed opening, a washer arranged on the plunger rod beneath said plate, the upper end of said plunger rod being threaded, a cap telescopically engaged upon said tubular neck and having a threaded socket therein to engage the threads on the plunger rod whereby said cap may be adjusted, the lower end of said cap engaging with the top of the reservoir to limit the downward movement of the plunger, a plunger head on the lower end of said rod, said reservoir having an outlet for the lubricant, and a coiled spring disposed between said outlet and the plunger head to normally project said plunger rod upwardly.

In testimony whereof I hereunto affix my signature in the presence of two witnesses.

BENJIMAN H. TURNAGE.

Witnesses:
T. I. ROGERS,
C. P. TOWNSEND.